J. F. NEEDHAM.
SEEDER.
APPLICATION FILED MAR. 20, 1914.
1,160,526.
Patented Nov. 16, 1915.
2 SHEETS—SHEET 1.
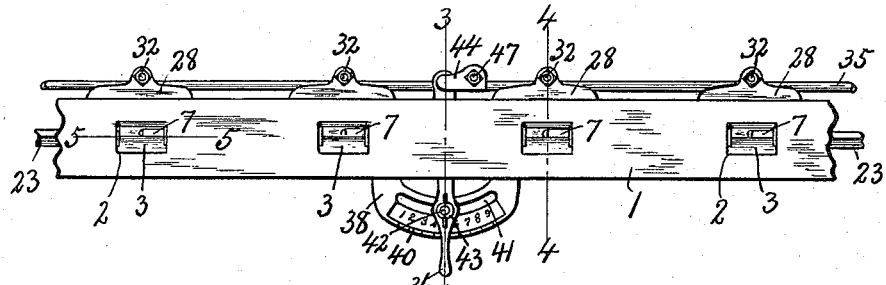
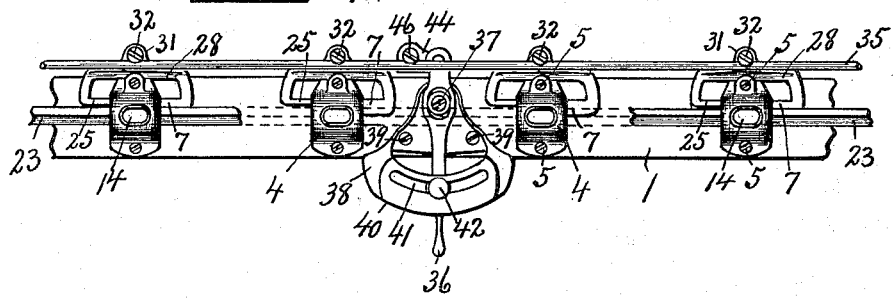
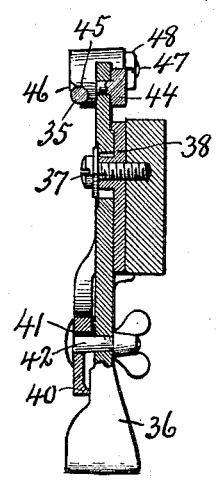
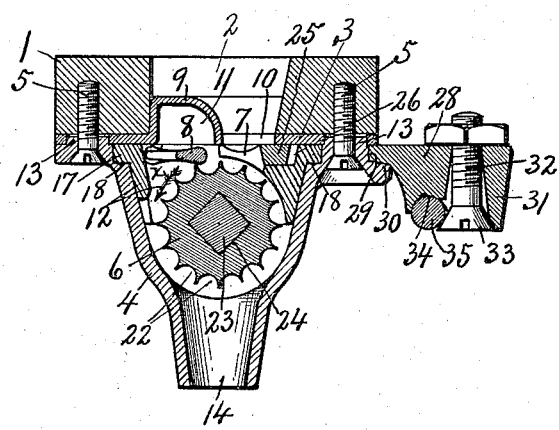
WITNESSES:
INVENTOR.
J. F. Needham
BY Howard P. Denison
ATTORNEY.

J. F. NEEDHAM.
SEEDER.
APPLICATION FILED MAR. 20, 1914.
1,160,526.
Patented Nov. 16, 1915.
2 SHEETS—SHEET 2.
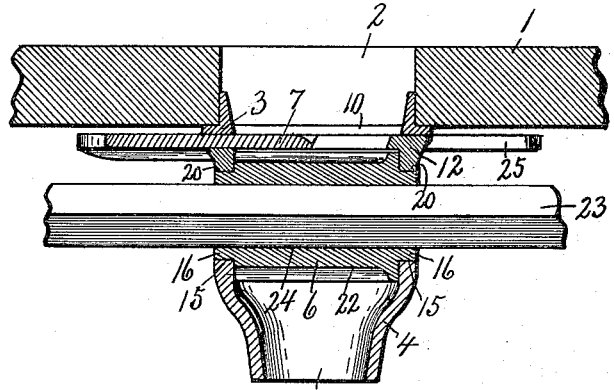
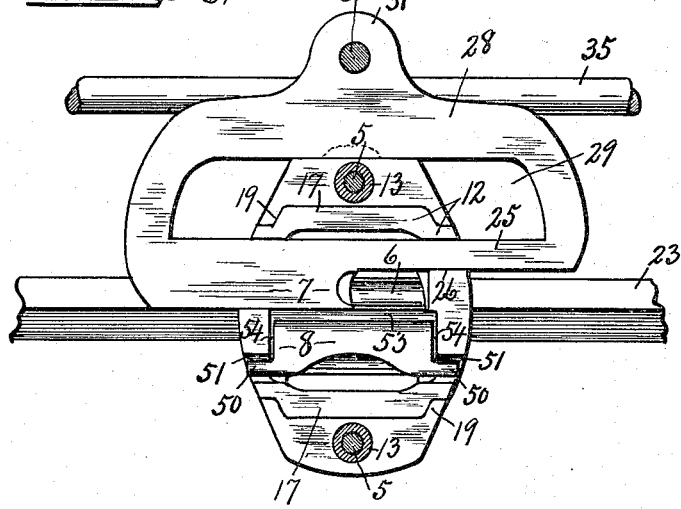
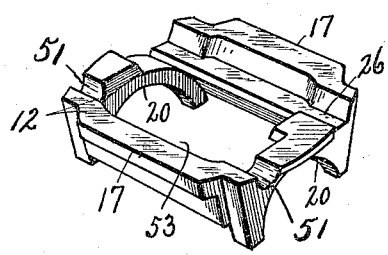
WITNESSES:
INVENTOR.
J. F. Needham
BY
Howard P. Denison
ATTORNEY.

UNITED STATES PATENT OFFICE.

JOHN F. NEEDHAM, OF PHELPS, NEW YORK.

SEEDER.

1,160,526.  Specification of Letters Patent.  Patented Nov. 16, 1915.

Application filed March 20, 1914. Serial No. 825,965.

*To all whom it may concern:*

Be it known that I, JOHN F. NEEDHAM, of Phelps, in the county of Ontario, in the State of New York, have invented new and useful Improvements in Seeders, of which the following, taken in connection with the accompanying drawings, is a full, clear, and exact description.

This invention relates to certain improvements in seeders and refers more particularly to the means for feeding predetermined quantities of the seeds from the reservoir or seed container to the delivery tubes either in front or at the rear of the drill hoes.

The main object is to embody in a single mechanism of simple and economic construction means for regulating the quantity of seeds which may be fed to the delivery tube or tubes and at the same time to render the feeding more positive, continuous and uniform so that the same quantity will be fed to all portions of each row throughout its length.

Another object is to reduce to a minimum any liability of cracking or mutilating the seeds in transit through the feeding mechanism.

Other objects and uses will be brought out in the following description.

In the drawings,—Figure 1 is a top plan of a portion of a seed-feeding machine showing a plurality of my improved feeding mechanisms together with means for regulating the quantity of seeds fed to the delivery tube. Fig. 2 is an inverted plan of the same mechanism. Figs. 3 and 4 are enlarged transverse sectional views taken respectively on lines 3—3 and 4—4, Fig. 1. Fig. 5 is an enlarged longitudinal sectional view through one of the feeding and regulating devices taken on line 5—5, Fig. 1. Fig. 6 is a top plan of the mechanism shown in Fig. 5 omitting the main supporting bar and guide-plate thereon, but showing the trailing gate for regulating the quantity of seed which may be delivered by the runs of the fluted drum. Fig. 7 is a perspective view of the detached upper half of the bearing or housing for one of the fluted feed drums and gates associated therewith.

The mechanism shown is adapted to be used in connection with multiple drills and comprises a main-supporting bar —1— adapted to be supported in a horizontal position in any suitable manner upon the frame of the machine so as to form the bottom of a seed container or reservoir (not shown), said bar being provided with a plurality of vertical rectangular openings —2— therethrough, spaced uniform distances apart and preferably elongated in the direction of length of the bar, the length of the bar and number of openings therein and also the spacing of the openings depending upon the number and distance apart of the rows into which the seeds are to be simultaneously planted although it is evident that a single feeding mechanism may be employed if desired.

Associated with each opening —2— is a cast metal plate —3— and a delivery chute —4— which are secured by screws —5— to the underside of the bar —1— and constitute a housing for receiving and supporting a fluted drum —6—, a sliding gate —7— and a vertically oscillating gate —8—, all of which are preferably made of cast metal and will be hereinafter more fully described.

The plate —3— is preferably clamped by the screws —5— between the upper face of the chute —4— and underside of the bar —1— as shown more clearly in Fig. 3 and preferably extends entirely around the adjacent end of the corresponding opening —2—, the central portion of said plate being provided with a raised lengthwise rib —9— of substantially the same length as, but of less width than the opening —2— so as to project into said opening and at the same time forming in the plate an additional opening —10— through which the seeds entering the opening —2— may be passed to the runs of the corrugated drum —6—.

The underside of the rib —9— is cut away throughout the greater portion of its length and width to form a chamber —11— for the purpose of reducing the weight of the plate and also to afford ample space for the vertical plate of the swinging gate —8—, the inner side of the rib adjacent the opening —10— being preferably curved or beveled to cause the seeds to gravitate more readily into said opening and thence into the runs of the corrugated drum —6—.

The delivery tube —4— is preferably funnel shape and constitutes the main body of the housing inclosing the rotary feeding drum —6—, gates —7— and —8— and an upper bearing section —12— for the ends of the drum —6—, the front and rear sides of the upper end or base of the delivery tube being provided with circular bosses —13— fitting in corresponding openings in the plate —2— through which the screws —5— pass so as to additionally lock the delivery tube and plate against relative movement when secured in operative position by the screws to the bar —1—.

The lower end of the delivery tube —4— is provided with a discharge opening —14— elongated in the direction of the length of the bar, while its upper portion is chambered out sufficiently to receive the drum —6— wholly below the superposed plate —3— and to permit free rotation of said drum, the ends of the delivery tube being provided with semi-circular bearings —15— for receiving and supporting the circular ends —16— of the drum.

The member —12— which may be termed a cap-plate, is fitted in the upper end of the delivery tube —4— and for this purpose its front and rear sides are provided with flanges —17— interposed between shoulders —18— on the adjacent portions of the tube and under sides of the corresponding portions of the superposed plate —3—, so that the cap-plate is clamped in place between the delivery tube and plate —3— when the latter is secured in operative position by the screws —5—, thereby holding the cap-plate against relative vertical movement, the same being held against lateral or endwise movement by shoulders —19— on the upper side of the delivery tube at the ends of the flanges —17—.

It will be seen from the foregoing description that the cap-plate —12— is nested wholly within the upper end of the delivery tube —4— and, as shown more clearly in Figs. 5 and 7, is provided with semi-circular bearings —20— engaging the upper sides of the circular ends —16— of the feeding drum —6— to coöperate with the lower bearings —15— for holding the drum in operative position.

The drum —6— is corrugated transversely or rather provided with a series of lengthwise grooves —22— in its periphery parallel with its axis and spaced uniform distances apart to form runs into which the seeds are deposited successively as the drum is rotated.

The means for rotating the drum consists of a shaft —23— preferably of angular cross section, passing through a correspondingly formed aperture —24— through the center of the drum so that when the shaft is rotated by any desired form of driving mechanism, not necessary to herein illustrate or describe, the drum will be correspondingly rotated to successively register its grooves —22— with the opening or passage —10— in the plate —3—, thereby conveying the seeds which may be deposited in the grooves into the underlying opening —14— in the bottom of the delivery tube —4—.

The front and rear sides of the cap-plate —12— preferably extend downwardly some distance into the upper end of the delivery tube and at the front and rear sides of the drum, the inner face of the rear side of the cap-plate being preferably concentric with and in close proximity to the periphery of the drum, so as to prevent the seeds from passing between those contiguous faces and thereby assure the feeding of all seeds which may pass through the opening —10— in the direction of rotation of the upper portion of the periphery of the drum, as indicated by arrow X, Fig. 3.

The sliding gate —7— consists of a lengthwise bar coextensive in area with and underlying the opening or passage —10— and is preferably formed integral with a somewhat narrower extension or continuation —25— which is guided in a lengthwise groove —26— in the upper face of the cap-plate —12— to allow the gate to move back and forth lengthwise of the opening —10— to vary the size of said opening according to the quantity of seeds which it is desired to feed to the delivery tube, or rather to the rotary feeding drum —6—. The gate —7— and its narrower extension —25— are thereby held and guided in their lengthwise movement between the upper face of the cap-plate —12— and under side of the plate —3—, so that the gate proper is located between the periphery of the drum and inner end of the passage —10— and is capable of entirely closing said passage to cut off its communication with the delivery tube if necessary or desirable, or it may be opened to varying degrees the full length of the drum and passage —10— or to any intermediate position, according to the quantity of seeds which it may be desired to feed into the delivery chute, it being understood that the drum is of substantially the same length as, and registered with, the opening —10—.

The ends of the gate —7—, including its extension —25— are integrally united to a sliding plate —28— having its main body spaced some distance apart from but parallel with the gate, so as to form an intervening lengthwise opening —29— through which the adjacent screws —5— and boss —13—, and also the adjacent portion of the cap-plate —12—, project thereby leaving the bar —28— wholly at the outside of the adjacent boss —13— to rest upon a ledge —30— on the contiguous edge of the delivery tube —4—, as shown more clearly in Fig. 3, thus forming an additional support for guiding the gate in its lengthwise movement.

Suitable means is provided for adjusting and setting this sliding gate to any position, and for this purpose I have shown the bar —28— forming an integral part of the gate as provided with a laterally projecting apertured boss —31— through which is passed a screw —32— having a head —33— at one end and a nut —34— at its opposite end, the inner lower side of the boss —31— being provided with a concave seat —34— between which and the head —33— of the screw is clamped a rod —35— running lengthwise of and parallel with the gate and, as shown in Figs. 1 and 2, is adapted to be connected to any number of gates which may be mounted upon the bar —1—. In like manner the drum shaft —23— may be extended to operate any number of feeding drums.

It is evident from the foregoing description that by loosening the clamping screw —33— the several gates may be adjusted to the same positions with relation to their drums or to different positions, so that one or more of the feeding devices might deliver a greater or less quantity of seeds than any one or more of the other feeding devices, if that should be desirable, but after the gates are properly set they are rigidly held in this position by the tightening of the clamping screw —33— so that all may be shifted simultaneously.

In addition to the means for adjusting the sliding gates, as just previously described, I have provided a hand lever —36— fulcrumed at —37— upon a bracket or plate —38—, which is secured by screws —39— to the under face of the bar —1— and is therefore rigid therewith, said plate or bracket being provided with a notched rack —40— and slot —41— both concentric with the axis of movement of the lever —36—, the slot —41— serving to receive a clamping screw —42— carried by the lever —36— and provided with a clamping nut —43— by which the lever may be clamped in any of its adjusted positions in interlocking engagement with any one of the notches of the rack —40—, so as to hold the lever in its adjusted position.

A link —44— is pivotally connected to the opposite end of the lever and is provided with a concave seat —45— for the rod —35—, said rod being clamped against the seat by the head —46— of a screw —47— which is passed through an aperture in the link and provided with a nut —48— for tightening the head of the screw upon the rod, thereby establishing a positive connection between the rod —35— and the lever —36— so that any movement of the lever will impart a similar movement to the rod for shifting the sliding gates to any desired position, either closed, full open or partially open, and when they are properly set, they may be held in this position by merely tightening the thumb nut —43— on the lever.

It will be observed upon reference to Fig. 1 that the notches of the rack —40— are designated by numerals, progressively increasing from one end to the other end of the rack for indicating the quantity of seeds which may be fed to the delivery chute.

The swinging gate —8—, as shown more clearly in Fig. 6, is provided at its opposite ends with pintles —50— which are seated in grooves or bearings —51— in the upper face of the cap-plate —12—, the main body of the plate being located at the inner side of the pintles and is adjusted so as to assume a position of rest in close proximity to the periphery of the drum.

The main body of the gate —8— is movable in a recess —53— in the upper side of the cap-plate —12— and while it is free to move upwardly from its normal horizontal position, into which it falls by its own weight, it is prevented from trailing on the ends of the periphery of the drum by having its ends normally resting against inclined faces —54— forming the end walls of the recess —53—, as shown more clearly in Fig. 6.

This gate is located just at the rear of the passage —10— so as to clear the adjacent edge of the sliding gate —7— and its inner edge is preferably rounded in cross section so as to effectively cut off any excess quantity of seeds beyond the capacity of the grooves in the periphery of the drum, so that each groove will feed substantially the same quantity of seeds into the delivery tube, while the freedom of upward movement of the gate serves to prevent cracking of the seeds which may become lodged between the ribs of the fluted drum and rounded edge of the gate during the rotation of said drum in the act of conveying the seeds from the inlet —10— to the delivery end of the tube.

In this manner a substantially uniform quantity of seeds are continuously delivered into the chute and thence into the furrow or upon the surface of the ground to assure a more uniform planting or drilling throughout the row or several rows.

The operation of my invention will now be readily understood upon reference to the foregoing description and the accompanying drawings, and while I have shown and described specific forms of devices for carrying out the several objects I do not wish to limit myself to such structure.

What I claim is:

1. In a seeding machine, a bar adapted to form the bottom of a seed reservoir and having an opening for the passage of seeds, a gate slidable across said passage, a delivery tube leading from said opening, a cap plate, a rotary fluted drum journaled in said tube and said cap plate, and a swinging gate journaled on said cap plate and adapted to normally assume by gravity a substantially horizontal position with a portion lying in close proximity to the periphery of said drum and to swing therefrom by contact of seeds therewith as the drum is rotated, to prevent cracking of the seeds.

2. In a seeding machine, a bar adapted to form the bottom of a seed reservoir and having an opening for the passage of seeds, a gate slidable across said opening, a plate having a raised lengthwise rib projecting into said opening and cut away upon its underside to form a chamber, a delivery tube, a fluted roll rotatable in the tube and a swinging gate having a portion normally positioned in close proximity to the periphery of said roll but free to swing therefrom into said chamber by contact of seeds therewith as the drum is rotated, to prevent cracking of the seeds.

3. In a seeding machine, a bar having a series of passages for seeds, a plate associated with each opening and having a rib projecting into its respective opening, a delivery tube leading from each of said openings, a separate cap member supported by each of said tubes, a gate slidably mounted between each plate and the cap member to vary the working size of said opening, and a separate fluted roll rotatable in each delivery tube for conveying seeds.

4. In a seeding machine, a bar having a series of passages for seeds, a plate associated with each opening and having a rib projecting into its respective opening, a delivery tube leading from each of said openings, a separate cap member supported by each of said tubes, a gate slidably mounted between each plate and the cap member to vary the working size of said opening, and a separate fluted roll journaled between each cap plate and a portion of its respective delivery tube and rotatable in said tube for conveying seeds.

5. In a seeding machine, a bar having a series of passages for seeds, a plate associated with each opening and having a rib projecting into its respective opening, a delivery tube leading from each of said openings, a separate cap member supported by each of said tubes, a gate slidably mounted between each plate and the cap member to vary the working size of said opening, a separate fluted roll rotatable in each delivery tube for conveying seeds, and means for simultaneously operating said gates.

6. In a seeding machine, a bar having a series of passages for seeds, a plate associated with each opening and having a rib projecting into its respective opening, a delivery tube leading from each of said openings, a separate cap member supported by each of said tubes, a gate slidably mounted between each plate and the cap member to vary the working size of said opening, a separate fluted roll rotatable in each delivery tube for conveying seeds, and a swinging gate journaled on the cap plate and adapted to normally lie in close proximity to the periphery of said drum and to swing therefrom by contact of seeds therewith as the drum is rotated.

7. In a seeding machine, a bar having a passage for seeds, a plate associated with and having a rib projecting into and partially closing said passage and forming a chamber —11—, a fluted roll rotatably mounted beneath the passage, a swinging gate having a portion normally resting in close proximity to the periphery of the drum and free to swing therefrom into the chamber —11— by contact of seeds therewith as the drum is rotated, to prevent cracking of the seeds.

8. In a seeding machine, a bar having a passage for seeds and a cut away portion adjacent said passage to form a chamber —11—, a delivery tube, a fluted drum rotatable in the tube, a sliding gate between the passage and the drum, and a swinging gate in close proximity to the periphery of the drum and free to swing therefrom into the chamber —11— by contact of seeds therewith as the drum is rotated, to prevent cracking of the seeds.

In witness whereof I have hereunto set my hand this 14th day of March, 1914.

JOHN F. NEEDHAM.

Witnesses:
E. F. NEEDHAM,
E. A. NEEDHAM.

Copies of this patent may be obtained for five cents each, by addressing the "Commissioner of Patents, Washington, D. C."